July 14, 1931.  O. J. KAY  1,814,045
VALVE ACTUATING MECHANISM
Filed Nov. 9, 1929
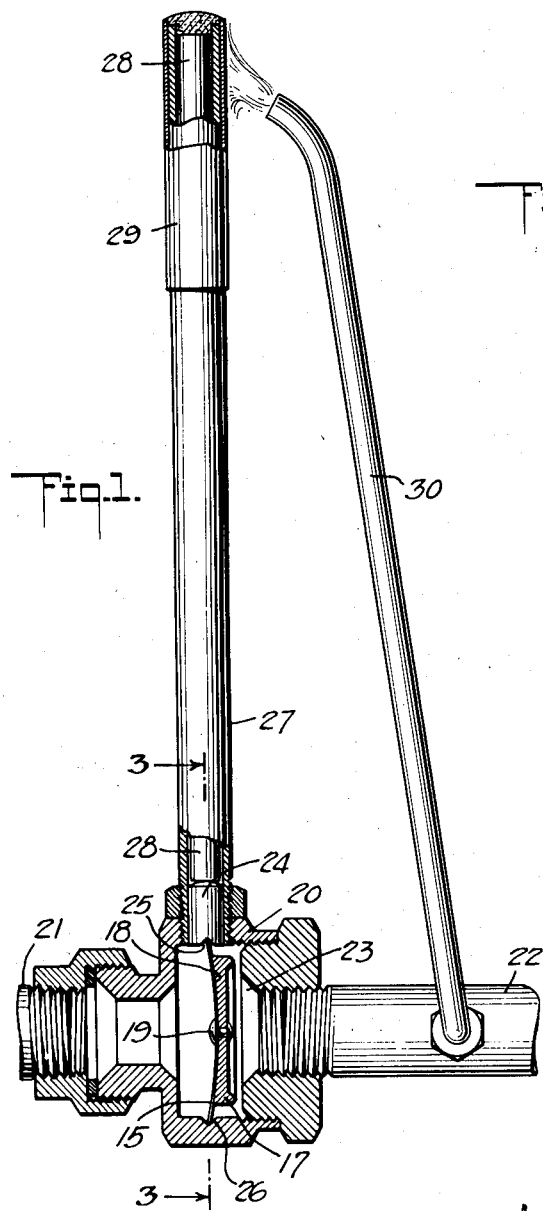
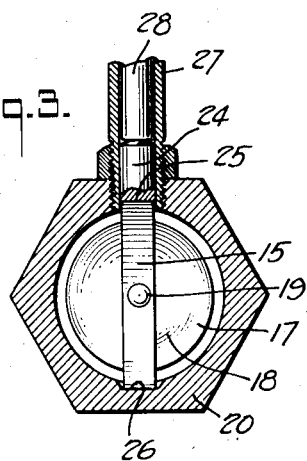
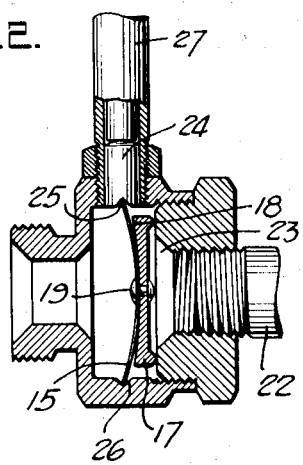
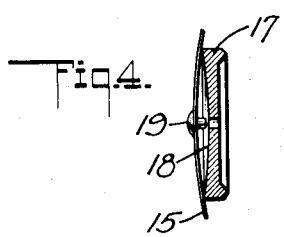
INVENTOR
OSCAR J. KAY
BY
ATTORNEYS Patented July 14, 1931

1,814,045

UNITED STATES PATENT OFFICE

OSCAR J. KAY, OF LOS ANGELES, CALIFORNIA

VALVE ACTUATING MECHANISM     REISSUED

Application filed November 9, 1929. Serial No. 406,020.

My invention relates to valves generally, and specifically to gas valves for water heaters where a thermo-responsive device is associated with the pilot light to open or close the gas valve according as the pilot is lighted or extinguished, and for the purpose of discontinuing the supply of gas to the main burner of the heater in the event that the pilot light is accidentally extinguished. In devices of this character as heretofore proposed, relatively complicated mechanisms have been provided between the thermo-responsive device and the gas valve to render the valve operable by the device in the manner just described. In addition to being complicated and consequently expensive to manufacture, such mechanisms are not positive in operation, and consequently, the gas valve is not always closed with the extinguishing of the pilot light so that gas continues to be supplied to the unlighted burner.

It is a purpose of my invention to provide a mechanism or connection between the thermo-responsive device and the gas valve which is extremely simplified in construction over previous mechanisms, and yet positive in operation so as to secure the complete closing of the valve upon the pilot light being extinguished.

I will describe only one form of valve actuating mechanism embodying my invention and in its association with a conventional form of thermo-responsive device and gas valve, where the former is operable by the pilot light of a water heater, and will then point out the novel features thereof in claims.

In the accompanying drawings:
Fig. 1 is a view showing in vertical section and partly in elevation, one form of valve actuating mechanism embodying my invention in association with a gas valve and thermo-responsive device where the latter is operable by a pilot light.

Fig. 2 is a fragmentary vertical sectional view showing the gas valve in closed position and as distinguished from the open position of the valve illustrated in Fig. 1.

Fig. 3 is a vertical sectional view taken on the line 3—3 of Fig. 1.

Fig. 4 is a vertical detailed view of the valve and spring shown in the preceding views to illustrate the normal curvature of the spring and before it is attached to the valve.

My invention in its present embodiment comprises in the main a valve body, an element movable in the valve body to occupy either of two extreme positions, a valve for controlling the flow of fluid through the valve body, and a resilient member supported by the valve body and the element, and connected to the valve so that normally the member retains the valve in open position and the element in one extreme position, but when the element is forcibly moved to its other extreme position, the member is flexed in a manner to move the valve to closed position.

In the specific embodiment of my invention herein illustrated, the resilient member is in the form of a leaf spring 15, the normal curvature of which, that is, its curvature before being applied to the valve 17, is substantially equal and opposite to the curvature of the concave side 18 of the valve, as illustrated in Fig. 4. A rivet 19 is extended immediately through the spring 15 and axially into the valve 17 for securing the spring to the concave side of the valve. By reason of the concavity of such side, the spring as secured to the valve is flexed to a curvature substantially reverse to its normal curvature, as shown in Fig. 1, but it will be understood that it still retains its tendency to return to its normal curvature, an important factor in the operation of the valve.

The valve body above referred to is shown as a pipe fitting 20 for connecting adjacent sections 21 and 22 of a pipe line for gas or other fluid, where one section 21 leads to a gas burner (not shown), and the other section 22 to a source of gas supply. This valve body 20 contains the valve 17 for controlling the flow of gas from the pipe section 22 to the other pipe section 21 through a port 23, so that when the valve is opened, gas can be supplied to the gas burner.

The valve body 20 is tapped to receive the aforementioned element, and this element is in the form of a plug 24 which is movable in the valve body to occupy the two extreme positions mentioned. The lower end of the plug, and the lower inner wall of the valve body, are notched, as indicated at 25 and 26, respectively, to receive the ends of the spring 15, and to thus support the spring in vertical position, with the attached valve 17 occupying a corresponding position.

In the normal position of the plug 24, that is, when it is in its upper extreme position, the spring is free to assume its normal position as attached to the valve and in which, the valve is held in open position. Of course, the spring constantly tends to assume that curvature which it originally had before its attachment to the valve, but by reason of the concavity of the valve wall, the spring is restrained against assuming such a curvature, and which, if permitted, would result in the spring moving past a dead center position, in which it would be impossible to return the valve to its normal open position, or to closed position, that is, through operation of the plug.

By forcing the plug 24 downward to its lower extreme position, the spring is flexed to the right as when viewed in Fig. 2, to move the valve to closed position with respect to the port 23. Only a small degree of movement of the plug is necessary to effect such a closure of the valve because its movement is greatly compounded in the flexing movement of the spring. It is important that the spring be connected to the valve as described, in order to allow sufficient independent movement of the valve to accommodate itself to any irregularities in the surface against which it seats and to thereby secure complete closure of the port.

In the adaptation of my invention to a pilot light for water heaters to discontinue the supply of gas to the main burner, and which supply is also controlled by a thermo operated valve (not shown) as in storage heaters, the plug 24 is mounted for vertical movement in an expansible tube 27 threaded at its lower end in the valve body 20 and welded at its upper end to nonexpanding rod 28 contained in the tube and having its lower end abutting the upper end of the plug 24. The usual sleeve 29 of non-corrosive metal surrounds the upper portion of the tube 27 against which the flame plays when the pilot is lighted. The pilot tube 30 extends upwardly from its point of connection with the pipe section 22, from which latter it receives a supply of gas.

In the operation of my invention as used in conjunction with a pilot light, contraction of the tube 27 functions through the rod 28 to move the plug 24 downward and to thus flex the spring 15 and thereby close the valve 17. As will be understood, the tube 27 contracts after the pilot light is extinguished in order to discontinue further gas supply to the burner of the heater in the event the thermo operated valve opens with the pilot extinguished. Conversely, when the pilot is lighted, the tube 27 expands and through the medium of the rod 28, permits the plug 24 to move upwardly, thereby allowing the spring to return to its normal position in which the valve is moved to open position.

Although I have herein shown and described only one form of valve actuating mechanism embodying my invention, it is to be understood that various changes and modifications may be made herein without departing from the spirit of the invention and the spirit and scope of the appended claims.

I claim:

1. As an article of manufacture, a valve having a substantially concave side, a leaf spring tending to assume a curvature which is opposed to the concave side of the valve, and means securing the spring to the concave side of the valve so that the spring is flexed to a curvature corresponding to the curvature of said side.

2. In combination, a valve body having a port, an element movable in the body to occupy either of two extreme positions, means for moving the element to either of said positions, a valve in the body for controlling the port and having a substantially concave side, a leaf spring tending to assume a curvature which is opposed to that of the concave side of the valve, said body and element engaging the spring respectively at its ends so that when the spring is flexed in one extreme position the spring will act to close the valve, and when the spring is partially straightened to the other extreme position, it will act to open the valve.

3. In combination, a valve body having a port, an element movable in the body to occupy either of two extreme positions, a valve in the body for controlling the port, and a leaf spring secured to the valve, said body and element engaging the respective ends of the spring so that when said element is in one extreme position the spring is flexed to close the valve, and when said element is in the other extreme position the spring returns to its normal position thus acting to open the valve.

4. As an article of manufacture, a valve, and a curved leaf spring secured between its ends centrally to one side of the valve and extending diametrically of the latter.

5. As an article of manufacture, a valve, a spring tending to assume one curvature, and means securing the spring to the valve so that the spring is flexed to assume another curvature.

6. As an article of manufacture, a valve, a spring tending to assume one curvature, and means securing the spring to the valve so that the spring is flexed to assume another curvature and to permit limited independent movement of the valve on the spring to allow the latter to accommodate itself to any irregularities in a surface against which it might seat.

OSCAR J. KAY.